United States Patent
Stewart et al.

(10) Patent No.: US 9,613,022 B2
(45) Date of Patent: Apr. 4, 2017

(54) CONTEXT BASED CUSTOMIZATION OF WORD ASSISTANCE FUNCTIONS

(71) Applicant: LENOVO (Singapore) PTE, LTD., New Tech Park (SG)

(72) Inventors: Aaron Michael Stewart, Raleigh, NC (US); Jeffrey E. Skinner, Raleigh, NC (US); Jonathan Jen-Wei Yu, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/614,084

(22) Filed: Feb. 4, 2015

(65) Prior Publication Data
US 2016/0224540 A1 Aug. 4, 2016

(51) Int. Cl.
*G06F 17/27* (2006.01)

(52) U.S. Cl.
CPC .......... *G06F 17/273* (2013.01); *G06F 17/275* (2013.01); *G06F 17/276* (2013.01)

(58) Field of Classification Search
None
See application file for complete search history.

(56) References Cited

U.S. PATENT DOCUMENTS

| 2006/0293878 | A1* | 12/2006 | Sanet | G09B 17/00 704/8 |
| 2009/0083249 | A1* | 3/2009 | Basson | G10L 15/26 |
| 2011/0202836 | A1* | 8/2011 | Badger | G06F 3/0237 715/702 |
| 2012/0095999 | A1* | 4/2012 | Donde | G06F 17/30654 707/728 |
| 2013/0231919 | A1* | 9/2013 | Xiong | G06F 17/2785 704/9 |
| 2014/0163954 | A1* | 6/2014 | Joshi | G06F 17/276 704/9 |
| 2014/0244621 | A1* | 8/2014 | Lindsay | G06F 17/30699 707/722 |
| 2015/0324353 | A1* | 11/2015 | Wu | G06F 17/289 704/9 |

* cited by examiner

*Primary Examiner* — Qian Yang
(74) *Attorney, Agent, or Firm* — Kunzler Law Group

(57) ABSTRACT

For generating customized word assistance functions based on user information and context, a system, apparatus, method, and computer program product are disclosed. The apparatus includes a processor and a memory that stores code executable by the processor, including code that accesses personal information of a user, identifies a dialectal nuance of the user based on the personal information, and selects a word recognition dictionary based on the dialectal nuance. The dialectal nuance may be based on a location of the user, a nationality of the user, an age of the user, an education level of the user, and/or a profession of the user. The apparatus may also suggest one or more text entries from the selected word recognition dictionary based on the user input.

15 Claims, 6 Drawing Sheets

CONTEXT BASED CUSTOMIZATION OF WORD ASSISTANCE FUNCTIONS

FIELD

The subject matter disclosed herein relates to user assistance functions for computer applications and more particularly relates to generating customized word assistance functions based on user information and context.

BACKGROUND

Description of the Related Art

Word assistance functions such as auto-correction, auto-completion, and word suggestion are common in text-based applications (e.g., a word processor or email client) and on devices utilizing on-screen keyboards. Current word assistance functions reference dictionaries of the respective languages in use. Some word assistance functions use information about the keyboard layout and word occurrence rates to compare what was typed with dictionary entries to determine the most likely string intended by the user. However, these solutions do not factor in more nuanced contextual information of how users' applied lexicons vary, such as by those involved in and the context of the communication.

BRIEF SUMMARY

An apparatus for customizing word assistance functions based on user information and context is disclosed. A method and computer program product also perform the functions of the apparatus. The computer program product, in one embodiment, includes a computer readable storage medium that stores code executable by a processor.

The apparatus, according to one embodiment, includes a processor and a memory that stores code executable by the processor, the code including code that accesses personal information of a user, code that identifies a dialectal nuance of the user based on the personal information, and code that selects a word recognition dictionary based on the dialectal nuance. In one embodiment, the dialectal nuance is based on one or more of a location of the user, a nationality of the user, an age of the user, an education level of the user, and a profession of the user.

In certain embodiments, the apparatus includes code that suggests one or more text entries from the selected word recognition dictionary based on the user input. In certain embodiments, the apparatus includes code that retrieves the personal information from a networked data storage device.

In some embodiments, the apparatus includes code that determines whether a message recipient is a contact of the user based on the personal information and that retrieves the user's contact information for the message recipient, wherein selecting the word recognition dictionary includes selecting the word recognition dictionary based on the contact information. In some embodiments, the apparatus includes code that identifies a message recipient and determines a geographic location of the message recipient, wherein the word recognition dictionary is updated to include dialect used in the geographic location of the recipient. In further embodiments, the apparatus may include code that determines a relationship type between the user and the message recipient based on the personal information, wherein selecting the word recognition dictionary includes selecting the word recognition dictionary based on the determined relationship type.

The method, according to one embodiment, includes accessing, by use of a processor, personal information for a user inputting text, identifying a dialect trait of the user based on the personal information, and selecting a text recognition database based on the dialect trait. In certain embodiments, the method includes suggesting one or more text entries from the selected text recognition database based on the inputted text.

In some embodiments, the method includes determining whether an inputted word matches the dialect trait and suggesting at least one alternative term from the selected text recognition database in response to the inputted word not matching the dialect trait. In certain embodiments, the method includes receiving, from the user, a manual correction to a word from the selected text recognition database, updating the personal information for the user based on the manual correction, and reselecting the dialectal trait based on the updated personal information.

In certain embodiments, the method includes identifying a context of use for the inputted text, wherein selecting the text recognition database is further based on the social context. In some embodiments, the method includes identifying an application receiving the inputted text, wherein identifying a dialect trait includes determining a dialect trait based on the social context. In some embodiments, the method includes identifying a message recipient associated with the inputted text, wherein identifying a dialect trait includes determining a dialect trait based on the message recipient.

In one embodiment, the text recognition database includes a subset of a dictionary customized by the user, the subset including words and phrases matching the dialect trait. In one embodiment, the personal information includes a location of the user, a nationality of the user, a native language of the user, a native dialect of the user, an age of the user, an education level of the user, or a profession of the user. In one embodiment, the dialect trait includes a lexicon indicator specifying a type and an amount of lexicon in the text recognition database, the types of lexicon selected from the group consisting of slang, abbreviations, technical jargon, and profanity.

The program product, according to certain embodiments, includes a computer readable storage medium that stores code executable by a processor. In one embodiment, the executed code performs receiving input text from a user, accessing a personal information associated with the user, determining a lexical context based on the personal information, and selecting a word assistance library based on the lexical context.

In one embodiment, the program product also includes code to perform determining whether an inputted word matches the lexical context and suggesting at least one alternative term from the word assistance library in response to the inputted word not matching the lexical context. In some embodiments, the personal information includes a current location of the user and selecting a word assistance library includes selecting a word assistance library including a dialect of a geographical region associated with the current location of the user.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
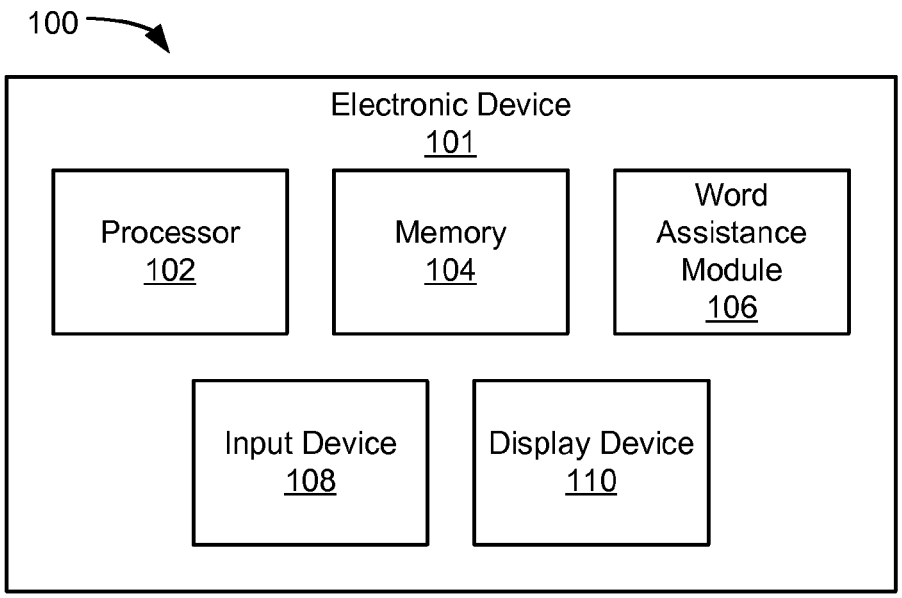
FIG. 1 is a schematic block diagram illustrating one embodiment of a system for customizing word assistance functions based on user information and context.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the disclosed systems, apparatuses, methods, and computer program products improve word assistance functions by accessing a personal information of a user inputting text, determining a dialectal nuance for the user based on the personal information, and selecting a word recognition dictionary based on the dialectal nuance. The vernacular a user utilizes at a given time is highly dependent on the topic of conversation, the comfort level the user may have with the topic of conversation, the education level and profession of the user, the user's relationship with the recipients of what is communicated, the formality level of the communication, a user's propensity to use abbreviations and slang and other factors that may uncover lexical uniqueness like region of birth, region of residence and age. The disclosed word assistance strategy Current word assistance functions allow custom additions to a personal dictionary when the user manual accepts (consciously or not) an entered text string that did not find a corresponding match in the current contents of the dictionary in use. Additionally, word assistance functions may use information about the keyboard layout and word occurrence rates to compare what was typed with dictionary entries to determine the most likely string intended by the user. Further, some word suggestion functions prioritize words that have frequent association with words already present in the larger text string. However, because these solutions do not factor in more nuanced contextual information, changes and suggestions to text strings are periodically unwanted or distracting for the user.

The disclosed word assistance strategy improves prediction of a user's word choice by identifying and employing "dialectal nuances" (e.g., lexical uniqueness of region, age group, profession, formality of use, etc.) to select a word recognition dictionary. Word probability based on dialectal nuances is an additional factor used to prediction of a user's word choice along with a custom dictionary (if present), word probability based on keyboard layout, and word probability based on other words in the string when providing word assistance functions, such as auto-complete and auto-correct functions.

Accordingly, the disclosed word assistance function would govern word suggestions and auto correction policies based on deeper understanding of the user (e.g., age, region of use, profession, etc.) and assumptions about the context of the communication (e.g., which application is being used, who are the recipients, frequency of subject matter in previous conversation, etc.). Beneficially, the disclosed systems, apparatuses, methods, and computer program products provide improved word assistance based on the context of the communication, including a rich personal profile.

As an example, an autocorrection function may change a user's entry of Y-A-L-L to the work "talk" due to keyboard layout and occurrence rate of the word in the English language. However, a user from the southern region of the US may indeed by attempting to communicate "y'all." Accordingly, the disclosed device may prioritize and/or recognize the increasedly probable use of various colloquialisms and word choices based on the user's region of birth or region of use.

As another example, a medical doctor may be typing many esoteric terms if using a smart device with an on-screen keyboard to create EMRs (Electronic Medical Records). The word assistance function of their device may be tuned by the user's profession and propensity to use technical jargon, such as medical and/or pharmaceutical terms. Thus, the device may recognize the increasedly probable use of medical terminology due to the user's profession and/or education. Additionally, the device may spell out abbreviations related to the user's profession and/or medical terminology into more generally understood terms.

In yet another example, a user may use slang and abbreviations when talking to friends in via a social networking service, such as when writing a FACEBOOK™ post, but use much more formal vernacular when talking to colleagues in using email. A word assistance device may recognizes the formality of the communication (e.g. social media vs. email, or frequent contacted "friend" vs. known associates in a contacts list) and adjust word suggestion and any autocorrection policies in effect to account for the increasedly probable use of casual language.

FIG. 1 depicts a system 100 for customizing word assistance functions based on user information and context, according to embodiments of the disclosure. The system 100 includes an electronic device 101 containing a processor 102, a memory 104, a word assistance module 106, an input device 108, and a display device 110. In one embodiment, the components of the electronic device 101 are connectively coupled to one another, for example via a computer bus or other data connection.

The processor 102, in one embodiment, may comprise any known controller capable of executing computer-readable instructions and/or capable of performing logical operations. For example, the processor 102 may be a microcontroller, a microprocessor, a central processing unit (CPU), a graphics processing unit (GPU), an auxiliary processing unit, a FPGA, or similar programmable controller. In some embodiments, the processor 102 executes instructions stored in the memory 104 to perform the methods and routines described herein. The processor 102 is communicatively coupled to the memory 104, the word assistance module 106, the input device 108, and the display device 110.

The memory 104, in one embodiment, is a computer readable storage medium. In some embodiments, the memory 104 includes volatile computer storage media. For example, the memory 104 may include a random access memory (RAM), including dynamic RAM (DRAM), synchronous dynamic RAM (SDRAM), and/or static RAM (SRAM). In some embodiments, the memory 104 includes non-volatile computer storage media. For example, the memory 104 may include a hard disk drive, a flash memory, or any other suitable non-volatile computer storage device. In some embodiments, the memory 104 includes both volatile and non-volatile computer storage media.

In some embodiments, the memory 104 stores data relating to customizing word assistance functions based on user information and context. For example, the memory 104 may store personal information (e.g., in one or more personal profiles), word assistance dictionaries, and the like. In some embodiments, the memory 104 also stores program code and related data, such as an operating system or other controller algorithms operating on the electronic device 101.

The word assistance module 106, in one embodiment, is configured to access personal information for a user inputting text, identify a dialectal nuance of the user based on the personal information, and select a text recognition database based on the dialectal nuance. In some embodiments, the word assistance module 106 also suggests one or more text entries from the selected text recognition database based on the inputted text. For example, the word assistance module 106 may determine whether an input word matches the dialectal nuance and suggest an alternative term from the selected text recognition database in response to the input word not matching the dialectal nuance.

The word assistance module 106 may be comprised of computer hardware, computer software, or a combination of both computer hardware and computer software. For example, the word assistance module 106 may comprise circuitry, or a processor, configured to detect that an incoming call is from an unknown contact. As another example, the word assistance module 106 may comprise computer program code that allows the processor 102 to collect relationship information regarding the unknown contact and determine a relationship to a user based on the collected relationship information. The word assistance module 106 is discussed in further detail with reference to FIG. 2, below.

The input device 108, in one embodiment, may comprise any known computer input device including a touch panel, a button, a keyboard, or the like. For example, the input device 108 may include a handwriting input unit operatively coupled to the processor 102. In some embodiments, the input device 108 may be integrated with the display device 110, for example, as a touchscreen or similar touch-sensitive display. In some embodiments, the input device 108 comprises a touchscreen such that text may be input by using a virtual keyboard displayed on the touchscreen and/or by handwriting on the touchscreen. In some embodiments, the input device 108 comprises two or more different devices, such as a keyboard and a touch panel.

The display device 110, in one embodiment, is configured to output visual, audible, and/or haptic signals. In some embodiments, the display device 110 includes an electronic display capable of outputting visual data to a user. For example, the display device 110 may include an LCD display, an LED display, an OLED display, a projector, or similar display device capable of outputting images, text, or the like to a user.

In certain embodiments, the display device 110 may receive instructions and/or data for output from the processor 102 and/or the application switching module 106. In some embodiments, all or portions of the input device 108 may be integrated with the display device 110. For example, the input device 108 and display device 110 may form a touchscreen or similar touch-sensitive display.

Figure 2:
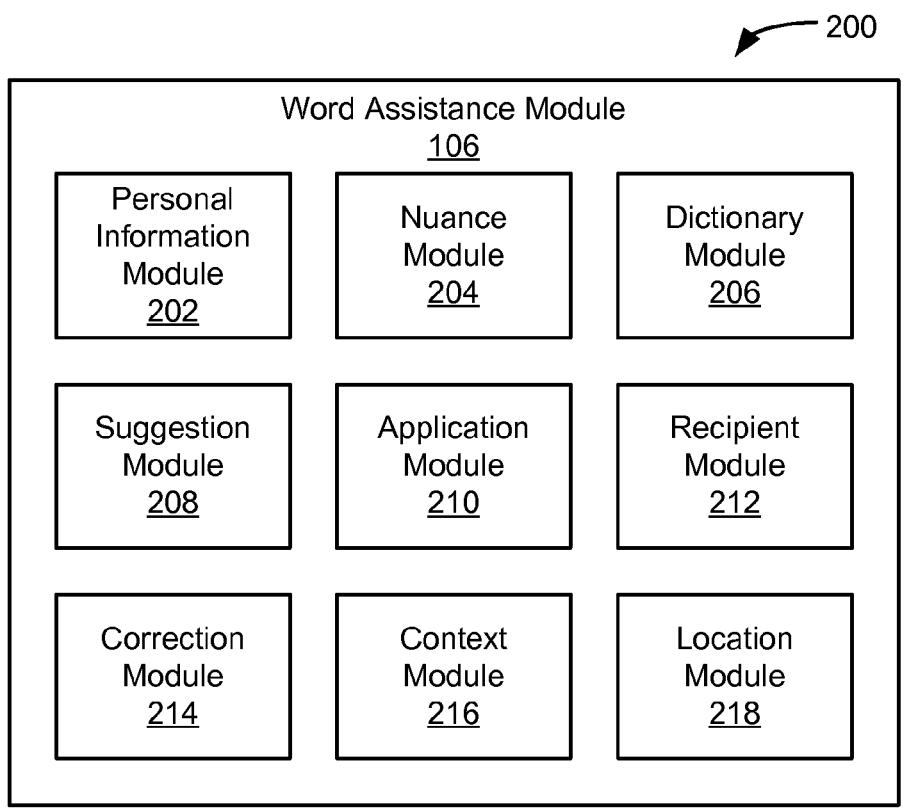
FIG. 2 is a schematic block diagram illustrating one embodiment of an apparatus for customizing word assistance functions based on user information and context.

FIG. 2 depicts a word assistance apparatus 200 for selecting a word recognition dictionary based on user information and context, according to embodiments of the disclosure. The word assistance apparatus 200 includes a word assistance module 106, which may be substantially similar to the word assistance module 106 described above with respect to FIG. 1. In general, the word assistance apparatus 200 accesses personal information of a user, identifies a dialectal nuance of the user based on the personal information, and selects a word recognition dictionary based on the dialectal nuance.

The word assistance module 106, in one embodiment, includes a personal information module 202, a nuance module 204, and a dictionary module 206. In some embodiments, the word assistance module 106 also includes one or more of a suggestion module 208, an application module 210, a recipient module 212, a correction module 214, a context module 216, and/or a location module 218. The modules of the word assistance module 106 may be communicatively coupled to one another.

The personal information module 202, in one embodiment, is configured to access personal information of a user. The personal information may be linked to an identifier of the user. In one embodiment, the personal information may be locally stored, for example at the memory 104, in one or more personal profiles and the personal information module 202 accesses a personal profile to obtain the personal information. In another embodiment, the personal information may be stored at a networked location, such as a server or network storage device, wherein the personal information module 202 accesses the personal information via a network interface. In further embodiments, the personal information module 202 may access a remote copy personal information stored at a networked location for a first time, create a local copy of the personal information, and access the local profile for subsequent times.

In some embodiments, the personal information module 202 may check for a personal information related to the user and prompt the user to create a personal profile containing personal information for the user if no pre-existing personal information is found. In further embodiments, the personal information module 202 may store a copy of the created personal profile on a networked location. In certain embodiments, the personal information module 202 may update personal information in an existing personal profile, for example in response to user input and/or to a change in the user's location. In further embodiments, the personal information module 202 may update a remote copy the personal information (e.g., stored in a personal profile).

In one embodiment, the personal information includes one or more personal traits relating to the user's word choice, including language, dialect, and/or lexicon employed in differing social settings. For example, the personal information may include information relating to a location of the user (e.g., a geographical region), a nationality of the user, a native, primary, and/or secondary language (or dialect) of the user, an age of the user, a profession of the user, a gender of the user, a cultural identity of the user, an education level of the user, a social class of the user, a user's interests, and/or a user's comfort level with profanity, slang, or technical jargon. In some embodiments, the personal information is shared across a variety of electronic devices owned and/or accessed by the user. For example, a user may use a common profile for her tablet computer and mobile phone, the common profile including the personal information.

In some embodiments, the personal information module 202 accesses public profiles of the user to supplement and/or update the personal information. For example, the personal information module 202 may access a user's social networking service profile to complement the personal information.

In a further embodiment, the personal information module 202 may determine whether information in a local personal profile conflicts with information in the social networking profile and prompt the user to resolve the conflicting information.

The nuance module 204, in one embodiment, is configured to determine a dialectal nuance for the user based on the personal information. As used herein, a dialectal nuance refers to the vernacular a user utilizes at a given time based, in part, on the user's background and demographics. The dialectal nuance is a factor used to evaluate the probability that a user will choose a particular word or phrase. The dialectal nuance may be based on a number of factors including the lexical uniqueness of a geographic region where the user is located and/or where the user has resided (e.g., lived for a significant amount of time). The dialectal nuance may also be based on the user's age group, education level, and/or profession. In one embodiment, the dialectal nuance may include a lexicon indicator specifying a type and an amount of lexicon in the word recognition dictionary (e.g., text recognition database), the types of lexicon selected from the group consisting of slang, abbreviations, technical jargon, and profanity. For example, the dialectal nuance may include an indication of the user's propensity to use abbreviations and slang.

In some embodiments, the nuance module 204 determines a dialectal nuance based on an analysis of information included in the personal information. For example, the nuance module 204 may determine the dialectal nuance based on information relating to the user's background, such as education, age, region of birth, and current region of residence. In one embodiment, the nuance module 204 parses the personal information for information relevant to one or more factors for a user's choice of words, weighs each item of parsed information (e.g., each factor) according to impact on word choice, and determines the dialectal nuance based on the weighted items (or factors). For example, the user's age and profession may have greater weight than the user's gender and social class in determining the user's choice of words in a particular social setting.

In certain embodiments, the nuance module 204 further identifies a context of use relating to the input text. As used herein, the context of use refers to the social setting associated with the input text, as well as the medium of communication. The nuance module 204 may receive information relating to the context of use from one or more of the application module 210, the recipient module 212, and the context module 216. Based on the received information, the nuance module 204 assesses how the context of use may influence the user's choice of words, such as terms, phrases, idioms, and/or colloquialisms used in conversation, and determines a dialectal nuance based, in part, on the context of use. For example, the application module 201 may identify an application receiving input text and the nuance module 204 may determine the dialectal nuance based on a context of use (social setting) associated with the identified application.

In certain embodiments, the nuance module 204 may receive information from one or more of the application module 210, the recipient module 212, the context module 216, and the location module 218 pertaining to the dialectal nuance, wherein the nuance module 204 determines the dialectal nuance based on information received from these modules. In some embodiments, the nuance module 204 determines the dialectal nuance based on the relationship between the user and the message recipient. In one embodiment, the nuance module 204 may determine the dialectal nuance based on an active application receiving the input text. In another embodiment, the nuance module 204 may determine the dialectal nuance based on a geographical location of the user and/or of the message recipient.

In certain embodiments, the nuance module 204 may select a word recognition dictionary based on a determined social setting associated with the input text. In one embodiment, the nuance module 204 may receive social context from the context module 216 indicating a social setting (e.g., formal, informal, professional, casual, or the like) associated with the input text. In another embodiment, the nuance module 204 may determine the social setting based on an application receiving the input text. For example, the nuance module 204 may receive an identification of an application using the input text from the application module 210. Based on the received social context and/or application identification, the nuance module 204 may then select a dialectal nuance that matches the social setting.

In one embodiment, the nuance module 204 identifies a native language of the message recipient. For example, the nuance module 204 may access contact information and/or other information of the message recipient to identify a native language of the recipient at a native language of the user. In response to the message recipient having a different native language than the user, the nuance module 204 may take into account the language barrier when determining a dialectal nuance. For example, the dialectal nuance may cause the dictionary module 206 to select a word recognition dictionary that includes easily translatable terms and that avoids idioms and colloquialisms that may be unfamiliar to the message recipient, in response to a language barrier existing between the user and the message recipient.

The dictionary module 206, in one embodiment, is configured to select a word recognition dictionary based on the dialectal nuance. As used herein, a word recognition dictionary is a database/library of words or phrases a user is likely to use, which is used by a computer to match input text with a word or phrase. In certain embodiments, the word recognition dictionary is used to predict a word or phrase the user is typing, for example as in an auto-completion function. In certain embodiments, the word recognition dictionary is used to correct spelling and/or grammar of input text, such as in an auto-correct function.

In some embodiments, the dictionary module 206 may select a subset of a standard (e.g., default) word recognition dictionary and/or of a custom (e.g., personalized) word recognition dictionary, the subset including words and phrases matching the dialectal nuance. For example, the dictionary module 206 may define a new word recognition dictionary containing the subset of a standard word recognition dictionary applicable to a determined dialectal nuance. In certain embodiments, the dictionary module 206 may select a subset of a word recognition dictionary that includes words, terms, phrases, idioms, and/or colloquialisms that are related to the dialectal nuance determined by the nuance module 204. For example, the dictionary module 206 may take a custom word recognition dictionary and filter out words, phrases, idioms, or colloquialisms that do not match the dialectal nuance. In a further example, words or phrases that do not match the dialectal nuance may include: idioms or colloquialisms specific to a geographical region that does not match a location of the message recipient (e.g., as indicated by an address book entry and/or a user profile of the message recipient), technical jargon, slang terms, profanity, and/or other language that is not appropriate to the social setting.

In one embodiment, the dictionary module 206 will select a word recognition dictionary (e.g., a text recognition database) based on a message recipient associated with the input text. For example, the dictionary module 206 may select a word recognition dictionary including language used among friends or familiar persons, when the message recipient is a known friend or close associate. In another embodiment, the dictionary module 206 may receive contact information for the message recipient and select the word recognition dictionary based on the contact information.

In one embodiment, the dictionary module 206 may select the word recognition dictionary based on a dialect or vernacular used in at the geographic location of the recipient and/or contact. Thus, the selected word recognition dictionary may include terms, phrases, idioms, and/or colloquialisms used in the geographic region where the recipient is located. As an example, if the recipient is located in the southern region of the United States of America, then the word recognition dictionary may include the term "y'all," which is particular to the South. Accordingly, if the user types the letters "Y-A-L-L" the term "y'all" may be included in auto-correct and/or auto-complete suggestions. In another embodiment, the dictionary module 206 may update the word recognition dictionary to include dialect used in the geographic location of the message recipient, in response to identifying a geographic location of the message recipient.

In some embodiments, the dictionary module 206 may select a word recognition dictionary based on a determined relationship between the user and the message recipient and/or contact, the selected word recognition dictionary including words or phrases suitable to the determined relationship. For example, a contact entry corresponding to the message recipient may indicate a relationship type such as friendship or professional. In a further example, the dictionary module 206 may filter a list of candidate word recognition dictionaries based on the relationship.

In one embodiment, the dictionary module 206 receives the indication of the determined relationship from the recipient module 212. In another embodiment, the dictionary module 206 itself estimates a relationship type based on a frequency with which the user rights to the message recipient and/or based on or identifier associated with the message recipient. For example, the dictionary module 206 may examine a domain of an email address belonging to message recipient. If the email address domain belongs to a business or government entity, then the dictionary module 206 may assume the relationship type to be a professional relationship.

In certain embodiments, the dictionary module 206 may select a word recognition dictionary based on a determined social context associated with the input text. For example, the dictionary module 206 may select a word recognition dictionary that matches the social context, update the word recognition library to include language matching the social context, and/or filter out language from the word recognition dictionary that does not match the social context. In one embodiment, the dictionary module 206 may receive an indication of the social context from the context module 216. In another embodiment, the dictionary module 206 may determine the social context based on the application receiving the input text.

The suggestion module 208, in one embodiment, is configured to offer one or more suggestions based on the selected word recognition dictionary and the input text. In certain embodiments, the suggestion module 208 may suggest one or more auto-complete terms from the word recognition dictionary based on input text. The auto-complete terms may match the portion of input text already entered. For example, if the word recognition dictionary includes medical terminology, then the suggestion module 208 may suggest one or more medical terms matching the input text.

In some embodiments, the suggestion module 208 determines whether an input word matches the dialectal nuance and, in response to the input word not matching the dialectal nuance, suggests at least one alternative term from the selected word recognition dictionary. For example, if the input text is slang term and the dialectal nuance indicates that slang is not appropriate, the suggestion module 208 may suggest one or more alternative, non-slang terms that have the same meaning as the input slang term. As another example, the input text may include technical jargon but the dialectal nuance may indicate that technical jargon is not appropriate. Accordingly, the suggestion module 208 may suggest one or more alternative, layman terms from the word recognition dictionary to replace the technical jargon.

In one embodiment, the suggestion module 208 may suggest one or more easily translatable terms in response to message recipient having a different native language of the user. For example, the suggestion module 208 may identify that the user input an idiom or colloquialism which be confusing to a non-native speaker. Accordingly, the suggestion module 208 may suggest an alternative term or phrase that is more easily translatable, in order to improve communication between the user and the message recipient.

The application module 210, in one embodiment, is configured to identify an application receiving the input text. In certain embodiments, the application module 210 may access a list of active applications on the electronic device 101 and determine which active application receives the input text. The application module 210 may use one or more tools provided by an operating system when identifying the application receiving the input text.

In some embodiments, the application module 210 determines an identifier corresponding to the application receiving input text. For example, the application module 210 may determine an application identifier used by the operating system or other internal process. The application identifier may be used to identify an application type, wherein the application type may be used by the nuance module 204 to identify the dialectal nuance, by the dictionary module 206 to select a word recognition dictionary appropriate to the application, and/or by the context module 216 to identify a social context associated with the input text. For example, if the application module 210 identifies a social networking application as the application receiving the input text, then the nuance module 204 may assume that abbreviations, slang, and other informal language are appropriate and/or desirable forms of input text. Likewise, if the application module 210 identifies a word processing application as the application receiving the input text, then the dictionary module 206 may select a word recognition dictionary that includes formal language and phrases.

In certain embodiments, the application module 210 may send an indication of the identified application and/or application type to one or more other modules of the word assistance apparatus 200, such as the nuance module 204, the suggestion module 208, the recipient module 212, and/or the context module 216. While depicted in FIG. 2 as an independent module, in one embodiment, the application module 210 may be a submodule of the nuance module 204.

The recipient module 212, in one embodiment, is configured to identify a message recipient associated with the input text. In certain embodiments, the recipient module 212 determines whether a message is being composed to a contact of the user. For example, having identified the message recipient, the recipient module 212 may compare message recipient identity to a contacts database to determine whether the message composed to a contact. The user may store one or more contacts in the contacts database. In some embodiments, the contacts database may be stored locally on the memory 104. In other embodiments, the contacts database may be stored remotely, for example at a remote server, a messaging service server, and/or a social networking server. In further embodiments, the contacts database may be stored with the personal information of the user.

In certain embodiments, the recipient module 212 identifies the message recipient based on the message recipient field in an application receiving the input text, in response to the application being a messaging application (e.g., an email client, an instant messaging client, a text messaging client, etc.) or another application for communication between users. For example, the message recipient field may include the "to:" field of email or text message. In further embodiments, the recipient module 212 may perform a textual analysis of data in the message recipient field to identify the message recipient.

In some embodiments, the recipient module 212 determines a relationship between the user and the message recipient. The relationship may include a relationship type and relationship strength. For example, relationship type may be a personal relationship, a familial relationship, a business relationship, a formal relationship, an informal relationship, or the like. As another example relationship strength may indicate the length and/or depth of the relationship as evidenced by an amount of communication between the user and the message recipient.

The recipient module 212, in one embodiment, may determine the relationship by examining message history between the user and the message recipient. For example, the recipient module 212 may track the number of messages sent, the size of messages sent, and/or the frequency of messages sent. In a further embodiment, the recipient module 212 may combine information from a plurality of messaging applications (such as a social networking application, an instant messaging application, the text messaging application, an email application, or other messaging application) when determining a relationship between the user and the message recipient.

The correction module 214, in one embodiment, is configured to identify a user correction to a word from the selected word recognition dictionary (e.g., text recognition database). In some embodiments, the correction module 214 may update the personal information for the user based on the correction and trigger the nuance module 204 to re-determine the dialectal nuance in response to the user correction. In other embodiments, the correction module 214 may reselect the dialectal nuance and/or the word recognition dictionary based on the correction. In general, the correction module 214 uses the user correction to increase the accuracy of word prediction by the electronic device 101 and/or the word assistance module 106.

Examples of user corrections include, but are not limited to, the user input of a word or phrase not suggested by the word assistance module 106, user input of a word or phrase not in the selected word recognition dictionary, user input of a word or phrase not indicated by the dialectal nuance, or the like. In some embodiment, the correction module 214 receives an indication of a selection of a term suggested by the suggestion module 208 and updates the personal information, dialectal nuance, and/or word recognition dictionary based on the selection.

In one embodiment, the correction module 214 provides feedback to the nuance module 204, wherein the nuance module 204 improves the determination of the dialectal nuance based on the corrections to words from the selected word recognition dictionary. In another embodiment, the correction module 214 provides feedback to the dictionary module 206, wherein the dictionary module 206 selects a new word recognition dictionary based on the corrections to words from the selected word recognition dictionary.

The context module 216, in one embodiment, is configured to identify a social context associated with the input text. The social context may be used by the nuance module 204 to determine the appropriateness of slang, profanity, and/or technical jargon. In certain embodiments, the social context is based on a combination of factors, such as the relationship between the user and the message recipient, the familiarity of the user with a message recipient, the forum of communication, and the like.

In one embodiment, the context module 216 identifies a social setting associated with the input text, such as the formality of the communication. For example, while slang and/or profanity may be appropriate for casual or informal communication between friends, such language may be inappropriate for formal communication between coworkers or professionals. As another example, certain terms or phrases may be more likely to be used in a casual conversation than in a professional or business conversation. The context module 216 may indicate the social setting to the nuance module 204, wherein the nuance module 204 determines the dialectal nuance based, in part, of the social setting.

In one embodiment, the context module 216 receives an indication of an active application receiving input text from application module 210. The context module 216 may then identify a social context based on the type of application. For example a word processing application may be associated with a more formal social context in an instant messaging application. As another example, a user may use slang and abbreviations when talking to friends via a social networking service, such as FACEBOOK™, or a text messaging service, but use much more formal language when talking to colleagues via email. Further, previously input text may be analyzed to identify the social context of the conversation.

In some embodiments the context module 216 receives an indication of the message recipient from the recipient module 212. The context module 216 may then determine the social context associated with the message recipient. For example of the message recipient is a contact of the user the associated contact entry may be used to identify a profession and/or education level of the message recipient. In further embodiments, the context module 216 may receive an indication of the relationship between the user and the message recipient, such as whether the message recipient is work-related, business-related, or personal. The context module 216 may then determine a social context based on the relationship.

The location module 218, in one embodiment, is configured to identify a location associated with the user. The location does not need to be a precise location, rather the location identifies a geographic region having lexical or dialectal uniqueness. Geographic regions having lexical or dialectal uniqueness include, but are not limited to, different countries and regions within countries. For example, regions within United States include the Northeast, the Midwest (Midland), the South, and the West. Further, the regions may divided into one or more divisions each division forming a subset of the region. For example, the Northeast region of the United States may be subdivided into New England, New York, and Mid-Atlantic divisions. Each region or division must have a unique lexicon, although different regions and/or divisions may have related lexicons (e.g., sharing a common lexical core, yet also having unique words or phrases).

In certain embodiments, the word assistance apparatus 200 is communicatively coupled to a location sensor, such as a GPS receiver. Thus the location module 218 may obtain coordinates, such as GPS coordinates, representative of the user's current location and identify the geographic region of the user based on the coordinates. In certain embodiments location module 218 queries the electronic device 101 or a network device for the current location of the user.

In certain embodiments, the location module 218 may compare the identified current location of the user to a user location stored in the personal information associated with the user. In one embodiment, if the identified location does not match the stored location, then the location module 218 may prompt the user to correct the stored location. In another embodiment, the identified location does not match the stored location, then the location module 218 may flag the personal information as including a potentially incorrect location. In further embodiments, if the location module 218 repeatedly identifies that the current location does not match the stored location, the location module 218 may prompt the user to identify his or her location.

In some embodiments the location module 218 is also configured to identify the location associated with a message recipient. In one embodiment, the location of the message recipient may be public knowledge or may be easily obtained using the identity of the message recipient. For example, the message recipient may publish his or her presence and/or location to a server, wherein the location module 218 may query the server for the message recipient's location. In another embodiment, the location of the message recipient may be derived from an address or identifier associated with the message recipient. In certain embodiments, the message recipient may be associated with a contact entry and location of the message recipient may be included in that contact entry.

In some embodiments, the location module 218 may determine a geographic location of the recipient based on information received from the recipient module 212. For example, the recipient module 212 may identify a user profile associated with the message recipient wherein the location module 218 may identify a location based on the user profile of the message recipient.

FIGS. 3A-3D depict embodiments of a mobile device 300 for selecting a text recognition database based on a user's personal information and context. The mobile device 300, in one embodiment, is substantially similar to the electronic device 101 and may include a word assistance module 106, and/or a word assistance apparatus 200, as described above with reference to FIGS. 1-2. As depicted, the mobile device 300 includes a touchscreen 302, a virtual keyboard 304, and a suggested text field 306. Further, the mobile device 300 displays an application identifier field 308, which indicates an active application receiving text input at the virtual keyboard 304.

Figure 3A:
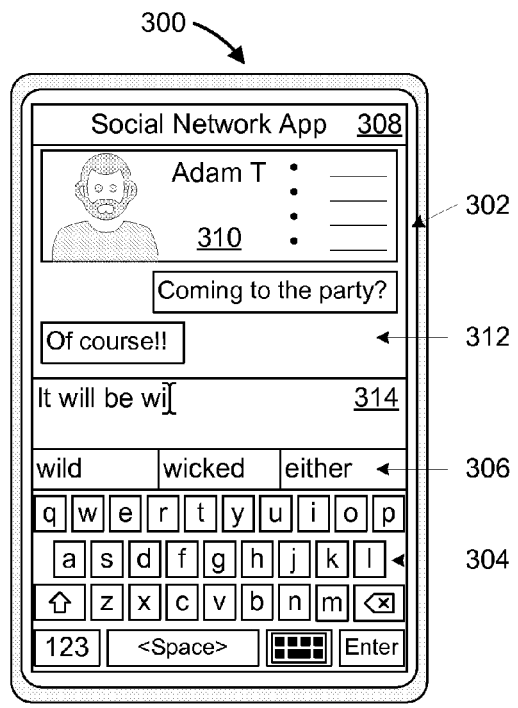
FIG. 3A is a diagram illustrating one embodiment of a mobile device for customizing word assistance functions of text entered into a social networking application.

FIG. 3A depicts the mobile device 300 while a social networking application receives the input text. The application identifier field 308 includes the name of the social networking application. The social networking application includes a message recipient window 310, a conversation window 312, and message composition field 314. The mobile device 300 uses the application identifier field 308, in combination with the user's personal information and on the message recipient (e.g., "Adam T"), to identify a dialectal nuance and them selects a text recognition database suitable for social networking based on the dialectal nuance. As used herein, a text recognition database refers to an organization of words or phrases (e.g., a dictionary or library) used by a text recognition algorithm to identify words or phrases entered by a user.

In the depicted embodiment, the user is responding to a received message and has already input the letters "W" and "I." The mobile device 300 selected the text recognition database based on the dialectal nuance. Accordingly, the mobile device 300 offers suggested terms from the selected text recognition database. As depicted, although the letters "W" and "I" were entered, the mobile device 300 may predictively suggest the commonly used term "either" as the letter "E" resides next to the letter "W" on the virtual keyboard 304.

In one embodiment, the mobile device 300 recognizes a long standing relationship between the user and the message recipient (e.g., based on the user's personal information) and, accordingly, selects a text recognition database that includes slang and/or other lexicon suitable to an informal conversation between friends. In response to the user inputting the letters "W" and "I," the mobile device 300 predicts three most probable terms (e.g., "wild," "wicked," and "either") in the suggested text field 306, based on the personal information and context of the conversation. Here, two of the suggested terms are slang terms appropriate to the informal conversation.

In a further embodiment, the mobile device 300 identifies (e.g., from the personal information) that the user lives in the New England region of the United States. Accordingly, the mobile device 300 may suggest a slang term common to the New England region of the United States (e.g., "wicked"). Alternatively, the mobile device 300 may identify that the recipient lives in the New England region of the United States and may suggest a term common to that region (e.g., "wicked").

Figure 3B:
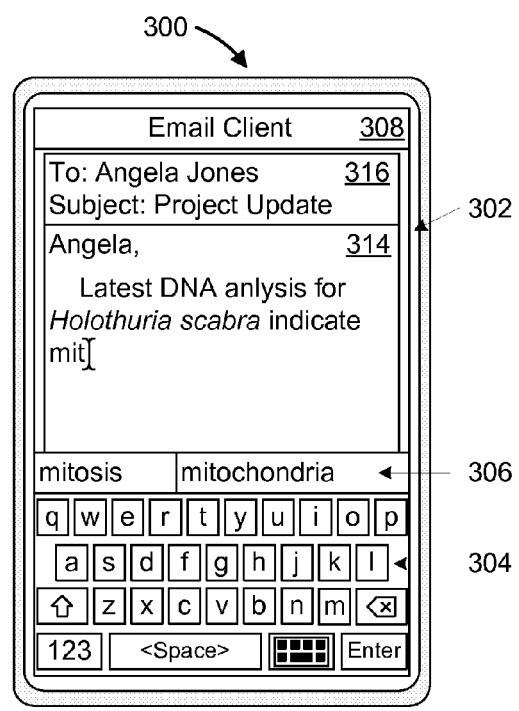
FIG. 3B is a diagram illustrating another embodiment of the mobile device for customizing word assistance functions of text entered into a social networking application.

FIG. 3B depicts the mobile device 300 while an email client receives the input text. In one embodiment, the application identifier field 308 indicates the name and/or another identifier belonging to the email client. The mobile device 300 may use the application identifier field 308, in combination with the user's personal information, to identify a dialectal nuance and then selects a text recognition database suitable for email conversations based on the dialectal nuance. In one embodiment, the email client includes an email header field 316, as well as the message composition field 314.

As depicted in FIG. 3B, the user composes an email to one "Angela Jones" regarding project update, as indicated by the email header field 316. In one embodiment, the mobile device 300 may identify a dialectal nuance (and thus select a text recognition database) based on the message recipient (e.g., "Angela Jones"). For example, the message recipient may be a contact of the user, wherein the mobile device 300 accesses the contact entry corresponding to "Angela Jones" to ascertain a relationship type (e.g., professional) between the user and the message recipient. Further, the personal information of the user may indicate a familiarity with technical jargon related to biology.

Accordingly, the mobile device 300 may select a text recognition database appropriate for a formal conversation between professionals in the field of biology. Here, the user has already typed letters "M," "I," and "T." Based on the selected word recognition database and the input letters, the mobile device 300 predicts two most probable terms in the suggestion field 306 (e.g., "mitosis" and "mitochondria"). Due to the nature of the conversation and/or of the message recipient, in one embodiment, the mobile device 300 may recognize the increased probability of using technical and biological terms over other terms, when suggesting words and an auto-complete and/or an auto-correct function.

Figure 3C:
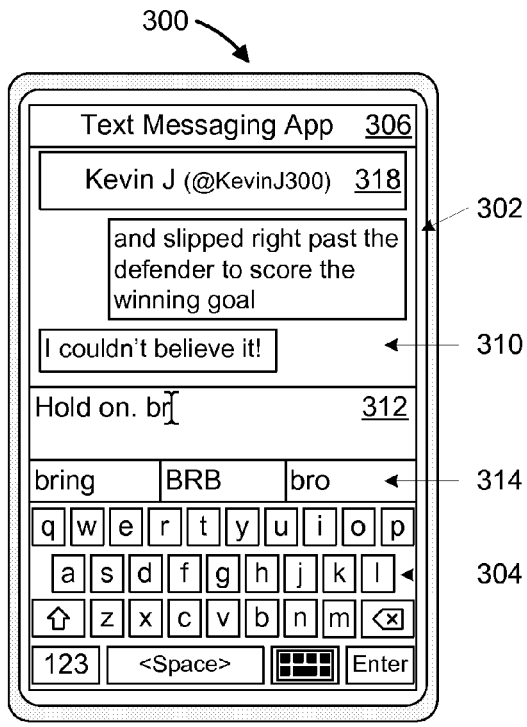
FIG. 3C is a diagram illustrating another embodiment of a mobile device for customizing word assistance functions of text entered into a social networking application.

FIG. 3C depicts the mobile device 300 while a text messaging application receives the input text. In one embodiment, the application identifier field 308 indicates the name and/or another identifier belonging to the text messaging application. The mobile device 300 uses the application identifier field 308, in combination with the user's personal information, to identify a dialectal nuance and then selects a text recognition database suitable for text messaging based on the dialectal nuance. In one embodiment, the text messaging application includes a message recipient field 318, a conversation window 310, and a message composition field 314.

As depicted in FIG. 3C, the user is responding to a latest message in a conversation with the message recipient (e.g., "Kevin J"). In one embodiment, "Kevin J" is a contact of the user. In a further embodiment, the mobile device 300 may determine that the user frequently messages "Kevin J." Additionally, the mobile device 300 may access the personal information of the user which indicates a propensity for abbreviations and/or slang in conversations with friends and frequent contacts. Moreover, in one embodiment, the personal information of the user may indicate an increased propensity for abbreviations when using the text messaging application, wherein the dialectal nuance reflect this propensity.

Accordingly, the mobile device 300 may select a text recognition database that includes abbreviations, slang, and other informal language, based on the personal information and context of the conversation. Here, the user has already typed the letters "B" and "R." Based on the selected word recognition database and the input letters, the mobile device 300 may predict three most probable terms (e.g., "bring," "BRB," and "bro") in the suggestion field 306. Due to the nature of the conversation (informal and/or between friends) and the medium of communication (text messaging), in one embodiment, the mobile device 300 includes at least one abbreviation in the suggest terms (e.g., "BRB"). Further, the mobile device may also include at least one slang term in the suggested terms (e.g., "bro").

Figure 3D:
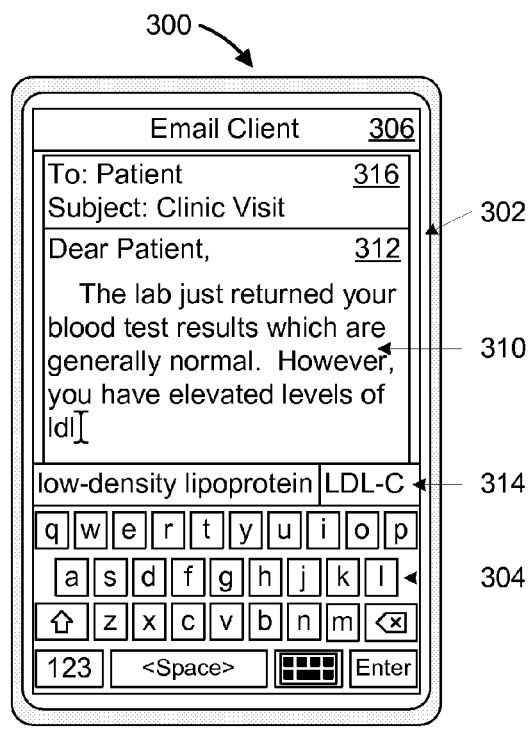
FIG. 3D is a perspective view diagram illustrating another embodiment of a mobile device for customizing word assistance functions of text entered into a social networking application.

FIG. 3D depicts the mobile device 300 while an email client application receives the input text. Again, the email client may include an email header field 316 and a message composition field 314. In one embodiment, the application identifier field 308 indicates the name and/or another identifier belonging to the email client. The mobile device 300 uses the application identifier field 308, in combination with the user's personal information, to identify a dialectal nuance and then selects a text recognition database suitable for an email conversation based on the dialectal nuance. As depicted in FIG. 3D, the user is composing an email to a "Patient" regarding a clinic visit, as indicated by the email header field 316. In one embodiment, the mobile device may access personal information of the user and determine that the user is a medical professional. Further, the mobile device 300 may identify that the message recipient (e.g., "Patient") is neither a medical professional nor a frequent contact of the user. Based on the personal information and the message recipient, the mobile device 300 may identify a dialectal nuance for the email message. Here, the mobile device 300 may identify the social setting of the conversation to be a formal setting and further determine the technical jargon, including medical terminology, is not appropriate to the instant conversation.

Accordingly, mobile device 300 may select a text recognition database based on the dialectal nuance and on message recipient. As shown, the user has already typed letters "L," "D," and "L." Based on the selected word recognition database and the input letters, the mobile device 300 may predict two technical terms related to medicine (e.g., "LDL-C" and "low-density lipoprotein") in the suggestion field 306. Here, the mobile device 300 may recognize that "LDL" is an abbreviation for "low-density lipoprotein" and that "LDL" is commonly used in reference to cholesterol using the acronym "LDL-C." In one embodiment, the mobile device 300 may first present the expanded version of the input acronym based on the dialectal nuance indicating the formal nature of the conversation.

Figure 4:
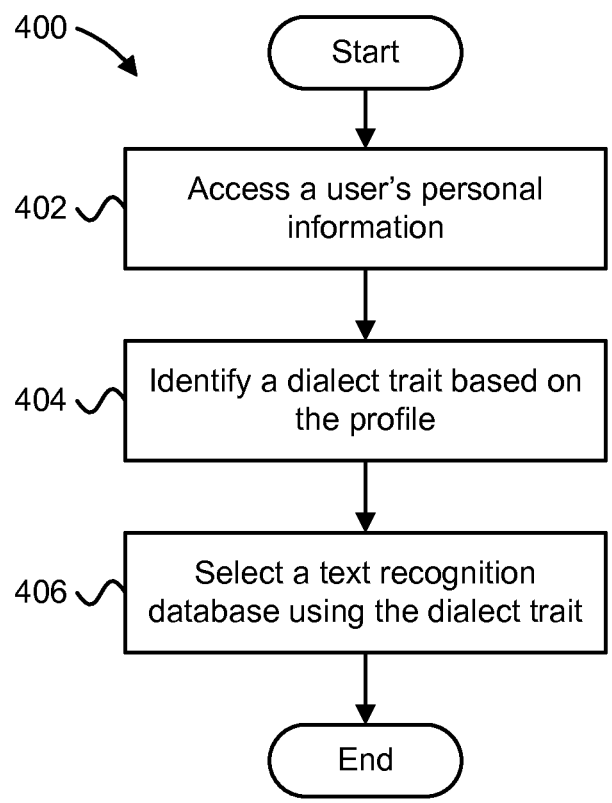
FIG. 4 is a schematic flow chart diagram illustrating one embodiment of a method for generating customized word assistance functions based on a user's personal information.

FIG. 4 depicts a method 400 for generating customized word assistance functions based on personal information, according to embodiments of the disclosure. In some embodiments, the method 400 is performed by a word assistance device, such as the electronic device 101 and/or the mobile device 300 described above with reference to FIGS. 1 and 3. In other embodiments, the method 400 may be performed by a word assistance module, such as the word assistance module 106 described above with reference to FIGS. 1 and 2. In certain embodiments, the method 400 may be performed by a processor executing program code, for example, a microcontroller, a microprocessor, a central processing unit (CPU), a graphics processing unit (GPU), an auxiliary processing unit, a FPGA, or the like.

The method 400 begins by accessing 402 a user's personal information for a user inputting text. In some embodiments, accessing 402 the user's personal information includes retrieving a personal profile from a local or networked data storage device. In certain embodiments, the personal information includes one or more personal traits relating to the user's word choice, including language, dialect, and/or lexicon employed in differing social settings. For example, the personal information may include information relating to a location of the user (e.g., a geographical region), a nationality of the user, a native, primary, and/or secondary language (or dialect) of the user, an age of the user, a profession of the user, a gender of the user, a cultural identity of the user, an education level of the user, a social class of the user, a user's interests, and/or a user's comfort level with profanity, slang, or technical jargon. Further, the personal information may be linked to an identifier of the user.

The method 400 identifies 404 a dialect trait of the user based on the personal information. As used herein, a dialect trait of a user refers to the user's preferences for word choice in a given social setting. In certain embodiments, the dialect trait is based on one or more personal traits relating to the user's word choice, including the location of the user, the nationality of the user, the age of the user, and a profession of the user. These personal traits may be included in the personal information.

In some embodiments, identifying 404 the dialect trait includes evaluating a number of factors including the lexical uniqueness of a geographic region where the user is located and/or where the user has resided (e.g., lived for a significant amount of time). In certain embodiments, the dialect trait indicates the vernacular a user utilizes at a given time based, in part, on the user's background and demographics. In one embodiment, the dialect trait may include an indicator specifying a type and an amount of lexicon employed by the user, the types of lexicon including slang, abbreviations, technical jargon, and profanity. In certain embodiments, identifying 404 the dialect trait includes determining a context of use, a social setting, and/or a relationship between the user and a message recipient.

The method 400 selects 406 a text recognition database using the dialect trait. The method 400 ends. In some embodiments, selecting 406 the text recognition database includes selecting a subset of a standard (e.g., default) text recognition database and/or a custom (e.g., personalized) text recognition database, the subset including words, terms, phrases, idioms, and/or colloquialisms matching the dialectal nuance or trait. In certain embodiments, selecting 406 the text recognition database includes taking a custom text recognition database and filtering out words, phrases, idioms, or colloquialisms that do not match the dialect trait.

Figure 5:
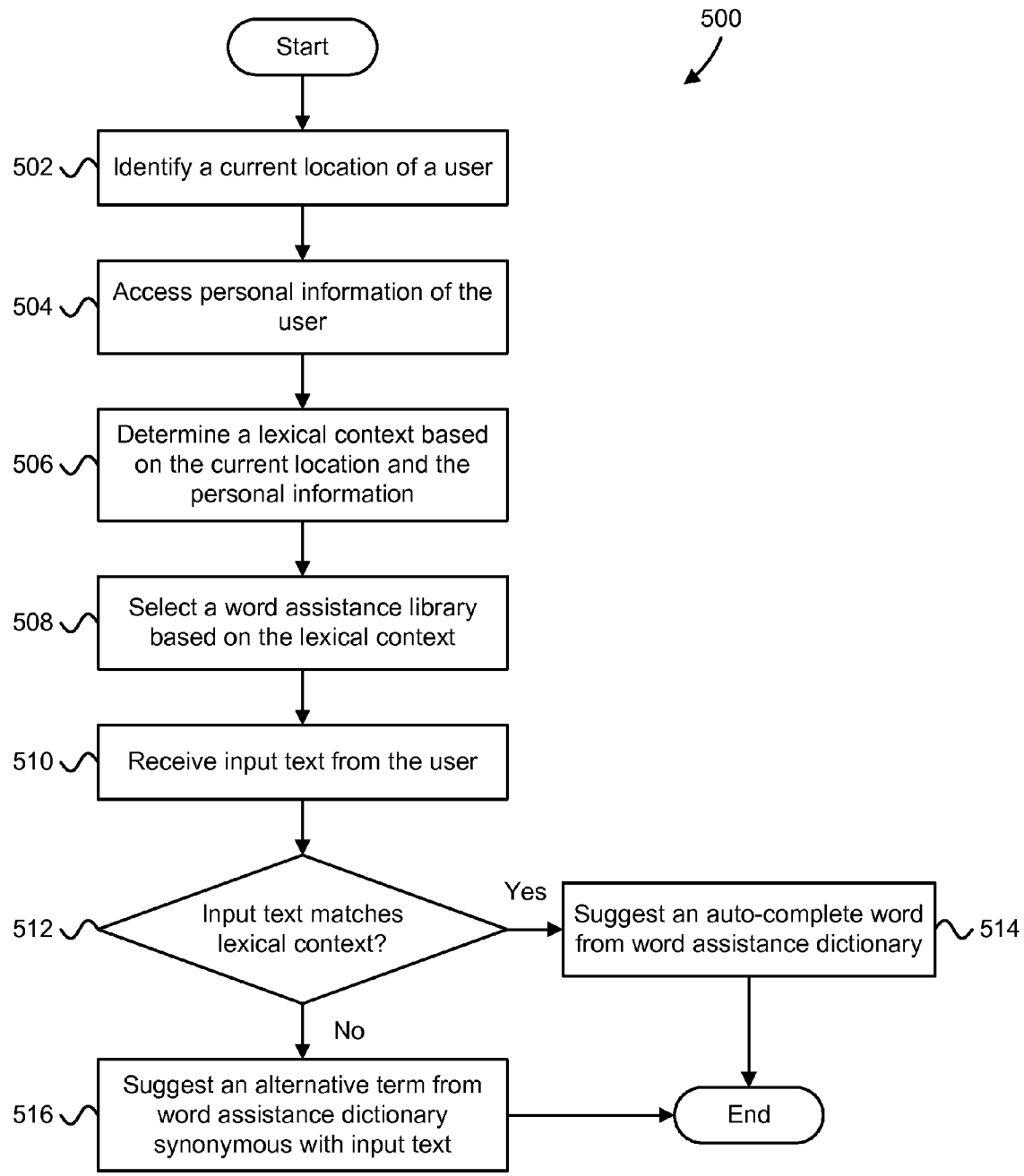
FIG. 5 is a schematic flow chart diagram illustrating another embodiment of a method for generating customized word assistance functions based on location and on a user's personal information.

FIG. 5 depicts a method 500 for generating customized word assistance functions based on location and on a user's personal information, according to embodiments of the disclosure. In some embodiments, the method 500 is performed by a word assistance device, such as the electronic device 101 and/or the mobile device 300 described above with reference to FIGS. 1 and 3. In other embodiments, the method 500 may be performed by an illumination adjustment module, such as the word assistance module 106 described above with reference to FIGS. 1 and 2. In certain embodiments, the method 500 may be performed by a processor executing program code, for example, a microcontroller, a microprocessor, a central processing unit (CPU), a graphics processing unit (GPU), an auxiliary processing unit, a FPGA, or the like.

The method 500 begins by identifying 502 a current location of a user. In some embodiments, identifying 502 the current location comprises retrieving location coordinates. For example, GPS coordinates may be retrieved from a GPS receiver communicatively coupled to the word assistance device (e.g., the electronic device 101).

The method 500 accesses 504 personal information belonging to the user. In certain embodiments, the personal information includes one or more personal traits of the user that influence the user's choice of words, including a location of the user, a nationality of the user, a native language of the user, a native dialect of the user, an age of the user, and a profession of the user. In one embodiment, accessing 504 the personal information includes retrieving a personal profile stored on a networked device, such as a networked data storage device. In another embodiment, accessing 504 the personal information includes accessing a personal profile stored on a local memory device such as the memory 104.

The method 500 determines 506 a lexical context based on the current location and the personal information. As used herein, a lexical context refers to a user's choice of lexicon in a particular context. In one embodiment, determining 506 lexical context includes identifying personal information relevant to the user's choice of words. For example, the user's education, social status, age, and/or native language may be relevant to the user's word choice in a particular setting or context. In another embodiment, determining 506 the lexical context may include identifying a dialect common to the user's current location.

The method 500 selects 508 a word assistance dictionary based on the lexical context. As used herein, a word assistance dictionary refers to a database and/or library of words or phrases a user is likely to use, which is used by a computer to assist with recognition of input text. As the words and/or phrases a user uses is influenced by setting and/or context, the word assistance dictionary is selected 508 based on the lexical context. In one embodiment, selecting 508 the word assistance dictionary may include selecting a subset of a default word assistance dictionary based on the lexical context. In another embodiment, selecting 508 the word assistance dictionary may include selecting a subset of a default word assistance dictionary may include filtering out slang terms and/or profanity from a default word assistance dictionary. In some embodiments, selecting 508 the word assistance dictionary may include selecting a subset of a default word assistance dictionary which includes words, terms, or phrases unique to the user's current location.

The method 500 receives 510 input text from the user. In one embodiment, the input text is received from a touchscreen device. For example, the touchscreen device may be a part of a smart phone or tablet computer. The method 500 determines 512 whether the input text matches the lexical context. In one embodiment, the input text is compared to entries in the selected word assistance dictionary when determining 512 whether the input text matches the lexical context.

If the input text matches the lexical context, the method 500 suggests 514 an auto-complete word or phrase from the selected word assistance dictionary. Otherwise, if the input text does not match the lexical context, the method 500 suggests 516 an alternative term from the selected word assistance dictionary, the alternative term being synonymous with the input text. The method 500 ends.

Figure 6:
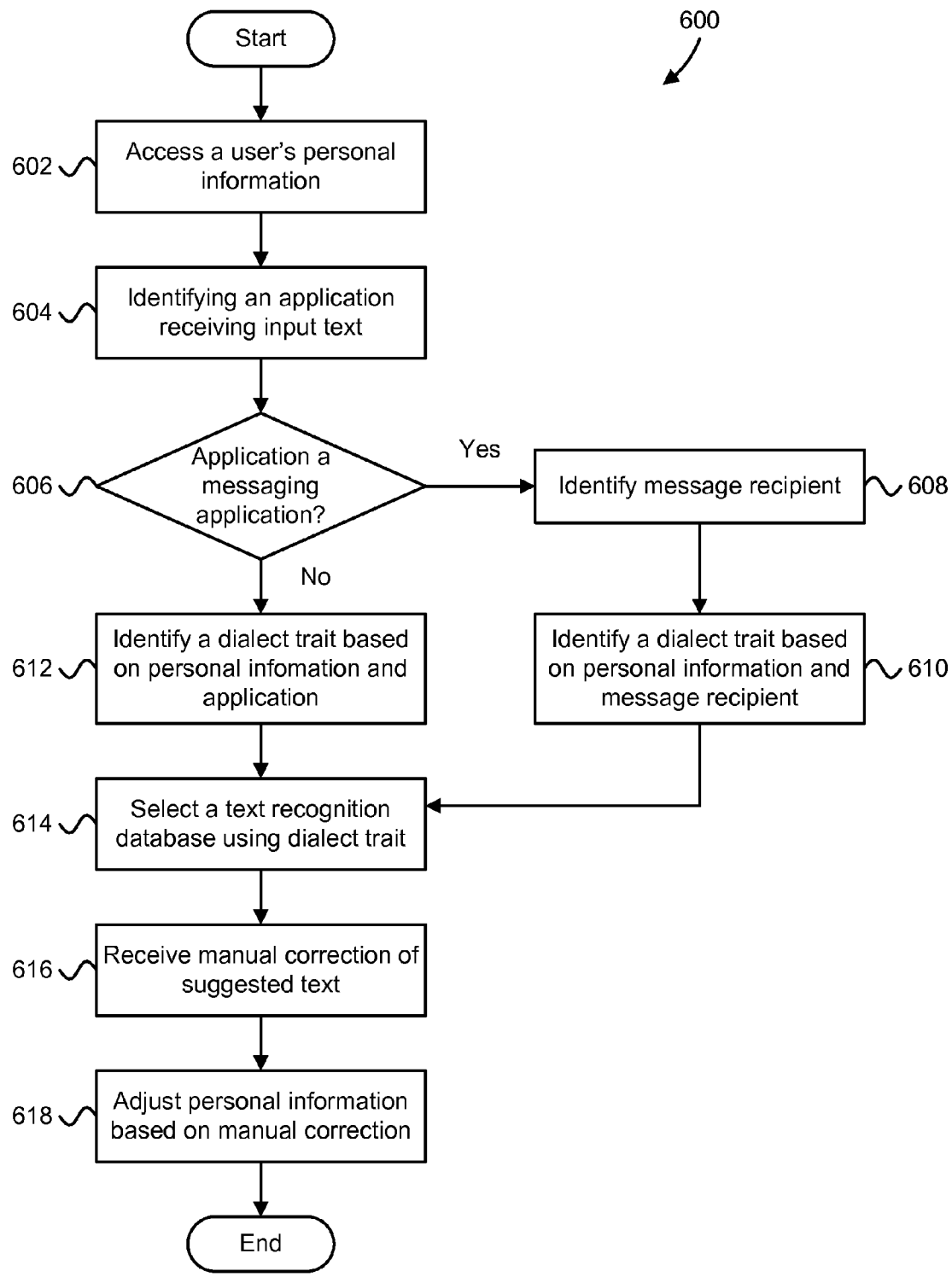
FIG. 6 is a schematic flow chart diagram illustrating another embodiment of a method for generating customized word assistance functions based on a user's personal information and on an application identity.

FIG. 6 depicts a method 600 for generating customized word assistance functions based on a user's personal information and an application identity, according to embodiments of the disclosure. In some embodiments, the method 600 is performed by a word assistance device, such as the electronic device 101 and/or the mobile device 300 described above with reference to FIGS. 1 and 3. In other embodiments, the method 600 may be performed by an illumination adjustment module, such as the word assistance module 106 described above with reference to FIGS. 1 and 2. In certain embodiments, the method 600 may be performed by a processor executing program code, for example, a microcontroller, a microprocessor, a central processing unit (CPU), a graphics processing unit (GPU), an auxiliary processing unit, a FPGA, or the like.

The method 600 begins by accessing 602 a user's personal information. In some embodiments, accessing 602 the user's personal information includes retrieving a user profile containing the personal information from a networked source. In a certain embodiments, accessing 602 the user's personal information includes accessing a global profile common to two or more electronic devices. The method identifies 604 an application receiving input is text. In some embodiments, identifying 604 the application includes receiving an indication from an operating system running on the electronic device. In certain embodiments identifying the application includes accessing an application identifier associated with the application.

The method determines 606 whether the application is a messaging application. In some embodiments determining 606 whether the application is a messaging application includes comparing an application identifier to a list of identifiers for known messaging applications.

In response to determining 606 that the application is a messaging application the method identifies 608 a message recipient. Otherwise, in response to determining 606 that the application is not a messaging application, the method identifies 612 a dialect trait based on the user's personal information and on the identified application. In some embodiments, identifying 608 the message recipient comprises identifying a "to:" field of a message and comparing an address or identifier in the "to:" field to a contacts list for the user. In certain embodiments, identifying 608 the message recipient comprises identifying a domain of an address or identifier of the message recipient.

Responsive to identifying 608 the message recipient, the method identifies 610 a dialect trait based upon the user's personal information and upon the message recipient. In certain embodiments, the dialect trait is based on one or more personal traits of the user, including the location of the user, the nationality of the user, the age of the user, and a profession of the user. These personal traits may be included in the personal information. In some embodiments, identifying 610 the dialect trait includes identifying a location of the user and/or a location of the message recipient, wherein the dialect trait is further identified based on the location. In further embodiments, identifying the location of the message recipient may include querying a location server for the message recipient's location using an address or identifier of the message recipient. In certain embodiments, identifying 610 a dialect trait may include associating a social setting with the messaging application, wherein the dialect trait is further identified based on the social setting.

Identifying 612 the dialect trait based on the personal information and on the application identity, in one embodiment, may include associating a social setting with the input text based on the application identity. Identifying 612 the dialect trait may then be based on the social setting and on the user's personal information.

The method selects 614 a text recognition database using the identified dialect trait. In some embodiments selecting 614 the text recognition database includes selecting a subset of a word recognition dictionary based on the dialect trait. In one embodiment, the dialect trait indicates the user's preference for slang, profanity, technical jargon, or other lexicon.

The method receives 616 a manual correction of suggested test and adjusts 618 the user's personal information based on the manual correction. The method 600 ends. In some embodiments, adjusting 618 the user's personal information includes updating a user profile stored locally or at a network location.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an input device that receives user input;
   a processor;
   a memory that stores code executable by the processor to:
   accesses personal information of a user of the apparatus, the personal information including an education level and profession of the user;
   identify a dialectal nuance of the user based on the personal information, the dialectal nuance indicating a propensity to use abbreviations, slang, and technical jargon;
   select a word recognition dictionary from a plurality of word recognition dictionaries based on the dialectal nuance, the selected word recognition dictionary including abbreviations, slang, and technical jargon as indicated by the dialectal nuance;
suggest one or more text entries from the selected word recognition dictionary based on user input of a partial word;
receives user input of a complete word;
determines whether the complete word matches the dialectal nuance; and
suggests at least one alternative term from the selected word recognition dictionary in response to the complete word not matching the dialectal nuance.

2. The apparatus of claim 1, wherein the processor further retrieves the personal information from a networked data storage device.

3. The apparatus of claim 1, wherein the processor further:
determines whether a message recipient is a contact of the user based on the personal information; and
retrieves the user's contact information for the message recipient, wherein selecting the word recognition dictionary comprises selecting the word recognition dictionary based on the contact information.

4. The apparatus of claim 1, wherein the processor further:
identifies a message recipient; and
determines a geographic location of the message recipient, wherein the word recognition dictionary is updated to include dialect used in the geographic location of the recipient.

5. The apparatus of claim 1, wherein the processor further:
identifies a message recipient; and
determines a relationship type between the user and the message recipient based on the personal information, wherein selecting the word recognition dictionary comprises selecting the word recognition dictionary based on the determined relationship type.

6. The apparatus of claim 1, wherein the dialectal nuance is further based on one or more of a location of the user, a nationality of the user, and an age of the user.

7. A method comprising:
receiving text input from a device user;
accessing, by use of a processor, personal information for the user inputting text, the personal information indicating an education level and a profession of the user;
identifying a dialect trait of the user based on the personal information, the dialect trait indicating an amount of slang, abbreviations, and technical jargon;
selecting a text recognition database from a plurality of text recognition databases based on the dialect trait, the selected text recognition database including abbreviations, slang, and technical jargon as indicated by the dialect trait;
suggesting one or more text entries from the selected text recognition database based on a partial word of the input text; determining whether a complete word of the text input matches the dialect trait; and
suggesting at least one alternative term from the selected text recognition database in response to the complete word not matching the dialect trait.

8. The method of claim 7, further comprising:
receiving, from the user, a manual correction to a word from the selected text recognition database;
updating the personal information for the user based on the correction; and
reselecting the dialectal trait based on the updated personal information.

9. The method of claim 7, further comprising identifying a social context for the inputted text, wherein selecting the text recognition database is further based on the social context.

10. The method of claim 7, further comprising identifying an application receiving the inputted text, wherein identifying a dialect trait comprises determining a dialect trait based on a social setting associated with the identified application.

11. The method of claim 7, further comprising identifying a message recipient associated with the inputted text, wherein identifying a dialect trait comprises determining a dialect trait based on the message recipient.

12. The method of claim 7, wherein the text recognition database comprises a subset of a dictionary customized by the user, the subset including words and phrases matching the dialect trait.

13. The method of claim 7, wherein the personal information includes information selected from the group consisting of a location of the user, a nationality of the user, a native language of the user, a native dialect of the user, and an age of the user.

14. A program product comprising a non-transitory computer readable storage medium that stores code executable by a processor, the executable code comprising code to perform:
receiving input text from a user of a device;
accessing a personal information associated with the user, the personal information including an education level and profession of the user;
determining a lexical context based on the personal information, the lexical context indicating a propensity to use abbreviations, slang, and technical jargon;
selecting a word assistance library from a plurality of word assistance libraries based on the lexical context, the selected word recognition dictionary including abbreviations, slang, and technical jargon as indicated by the dialectal nuance;
determining whether a complete word of the input text matches the lexical context; and
suggesting at least one alternative term from the word assistance library in response to the a complete word not matching the lexical context.

15. The program product of claim 14, wherein personal information comprises a current location of the user and selecting a word assistance library comprises selecting a word assistance library including a dialect of a geographical region associated with the current location of the user.

* * * * *